United States Patent
Yamaoka et al.

(10) Patent No.: US 10,795,404 B2
(45) Date of Patent: *Oct. 6, 2020

(54) INFORMATION PROCESSING ACCELERATION CONTROL SYSTEM

(71) Applicant: HITACHI, LTD., Chiyoda-ku, Tokyo (JP)

(72) Inventors: Masanao Yamaoka, Tokyo (JP); Takeshi Kato, Tokyo (JP); Chihiro Yoshimura, Tokyo (JP); Masato Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 349 days.

This patent is subject to a terminal disclaimer.

(21) Appl. No.: 15/754,614

(22) PCT Filed: Aug. 24, 2015

(86) PCT No.: PCT/JP2015/073740
§ 371 (c)(1),
(2) Date: Feb. 23, 2018

(87) PCT Pub. No.: WO2017/033263
PCT Pub. Date: Mar. 2, 2017

(65) Prior Publication Data
US 2019/0155330 A1    May 23, 2019

(51) Int. Cl.
*G06F 15/80* (2006.01)
*G06F 1/14* (2006.01)
(Continued)

(52) U.S. Cl.
CPC ............... *G06F 1/14* (2013.01); *G05B 13/04* (2013.01); *G06F 15/80* (2013.01); *G06N 3/0445* (2013.01); *G06N 3/0472* (2013.01); *G06N 3/063* (2013.01); *G06N 5/003* (2013.01); *G06N 10/00* (2019.01)

(58) Field of Classification Search
CPC ..................................................... G06N 10/00
See application file for complete search history.

(56) References Cited

U.S. PATENT DOCUMENTS

| 2014/0046626 A1 | 2/2014 | Yamamoto et al. |
| 2016/0118106 A1 | 4/2016 | Yoshimura et al. |
| 2018/0268315 A2* | 9/2018 | Utsunomiya ............ G06N 5/02 |

FOREIGN PATENT DOCUMENTS

| JP | H11337877 A | 12/1999 |
| JP | 2008-003937 A | 1/2008 |

(Continued)

OTHER PUBLICATIONS

Office Action dated Jul. 5, 2019 in Japanese Application No. 2017-536098.
(Continued)

*Primary Examiner* — Albert Wang
(74) *Attorney, Agent, or Firm* — Miles & Stockbridge, P.C.

(57) ABSTRACT

An aspect of the present invention for solving the above problem is a system including a first computer, a control module controlled by the first computer, and a second computer configured to be associated with the control module. The second computer includes a plurality of units, and each of the plurality of units includes a first memory that stores a value indicating a state of a node, a second memory that stores a coefficient, and an arithmetic circuit. The arithmetic circuit performs an arithmetic process of determining a value indicating a state of a node of its own unit, based on a value indicating a state of a node of a different unit and the coefficient of its own unit, and storing the determined value in the first memory. The control module supplies a control signal for controlling the arithmetic process to the second computer.

15 Claims, 13 Drawing Sheets

(51) Int. Cl.
  *G06N 3/04* (2006.01)
  *G06N 3/063* (2006.01)
  *G06N 5/00* (2006.01)
  *G05B 13/04* (2006.01)
  *G06N 10/00* (2019.01)

(56) References Cited

FOREIGN PATENT DOCUMENTS

| JP | 2011524035 A | 8/2011 |
| WO | 2009136888 A1 | 11/2009 |
| WO | WO 2012/0118064 A1 | 9/2012 |
| WO | WO 2014/0192153 A1 | 12/2014 |

OTHER PUBLICATIONS

Yamaoka, Masanao et al., "24.3 20k-Spin Ising Chip for Combinational Optimization Problem with CMOS Annealing", Solid-State Circuits Conference—ISSCC, 2015, IEEE, ISBN: 978-1-4799-6223-5.

Asakawa, Naoki et al., D-wave no Ryoshi Computer Ni Taiko Suru Shingata Computer o Shisaku, Nikkei Business Publications, Inc., Feb. 3, 2015.

News Release Yaku Iccho No Gohyakujo Tori No Bodai Na Pattern Kara Shunji Ni Jitsuyo Ni Tekishita Kai O Michibiku Shitsuon Dosa Kano na Shingata Handotai Computer o Shisaku, Hitachi, Ltd., Feb. 23, 2015.

\* cited by examiner

[Fig. 1]
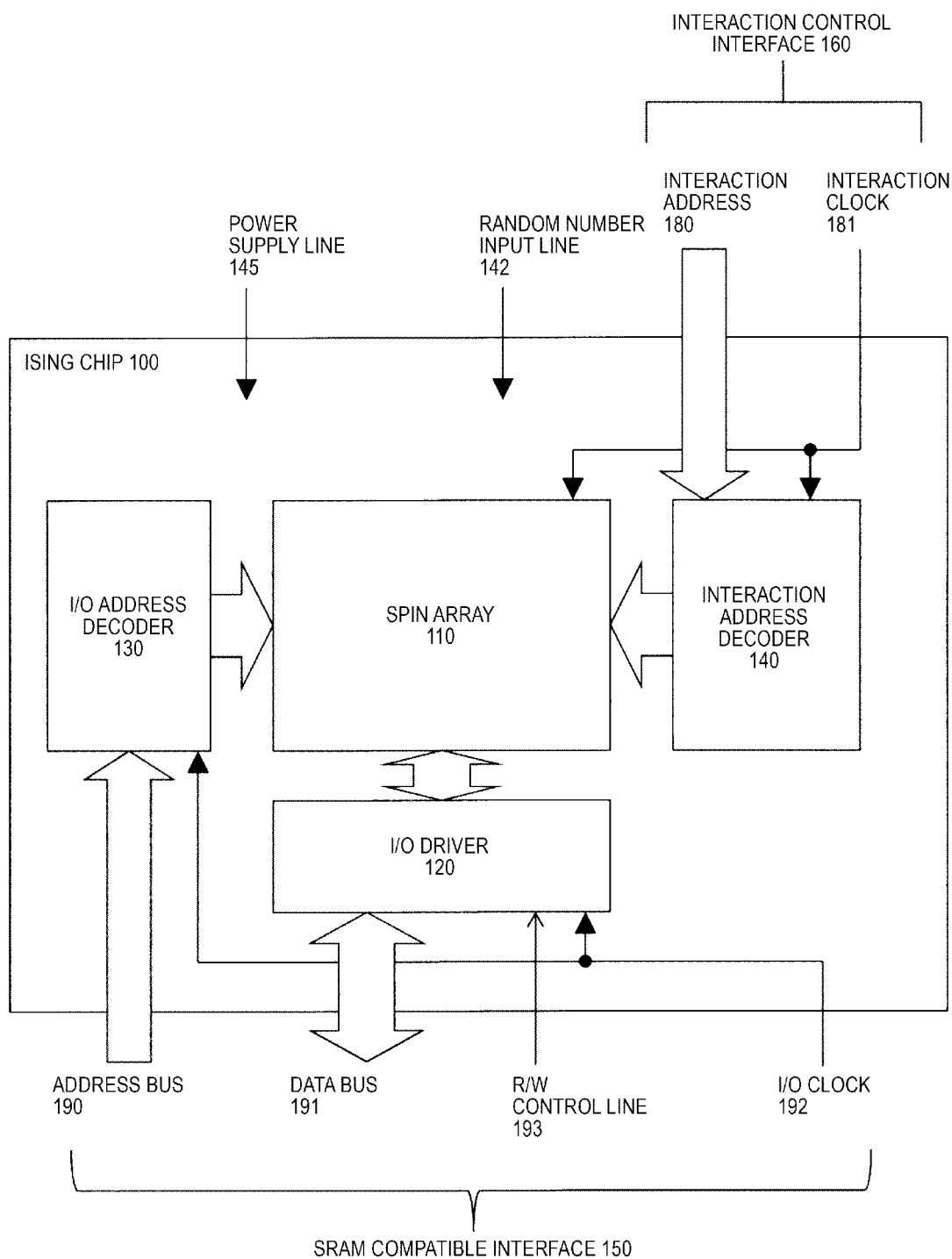

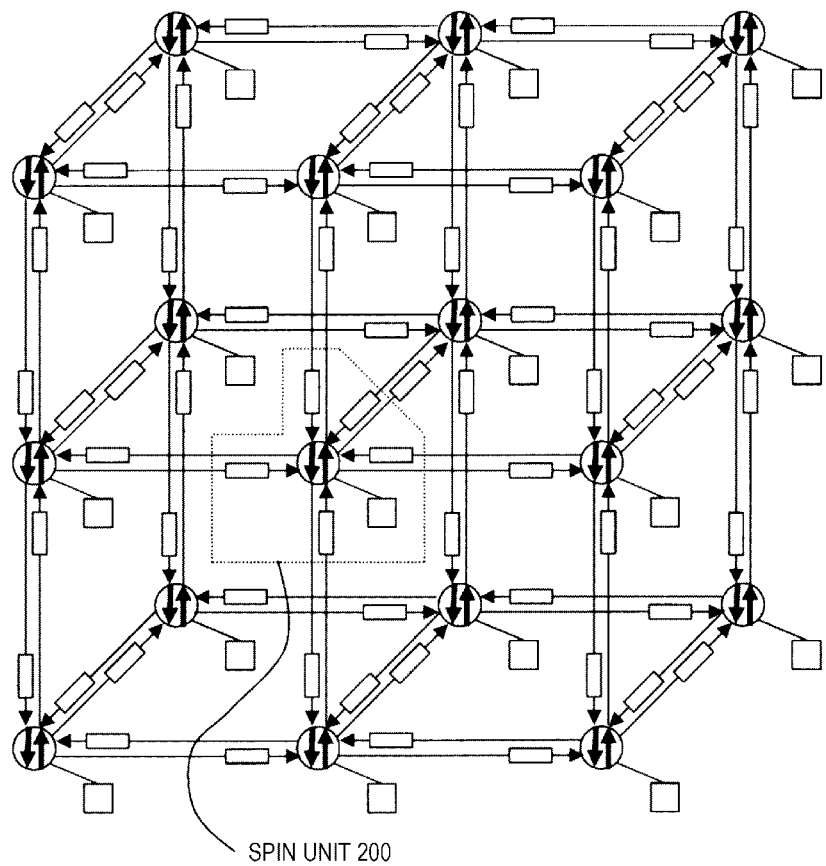
[Fig. 2]

[Fig. 3]
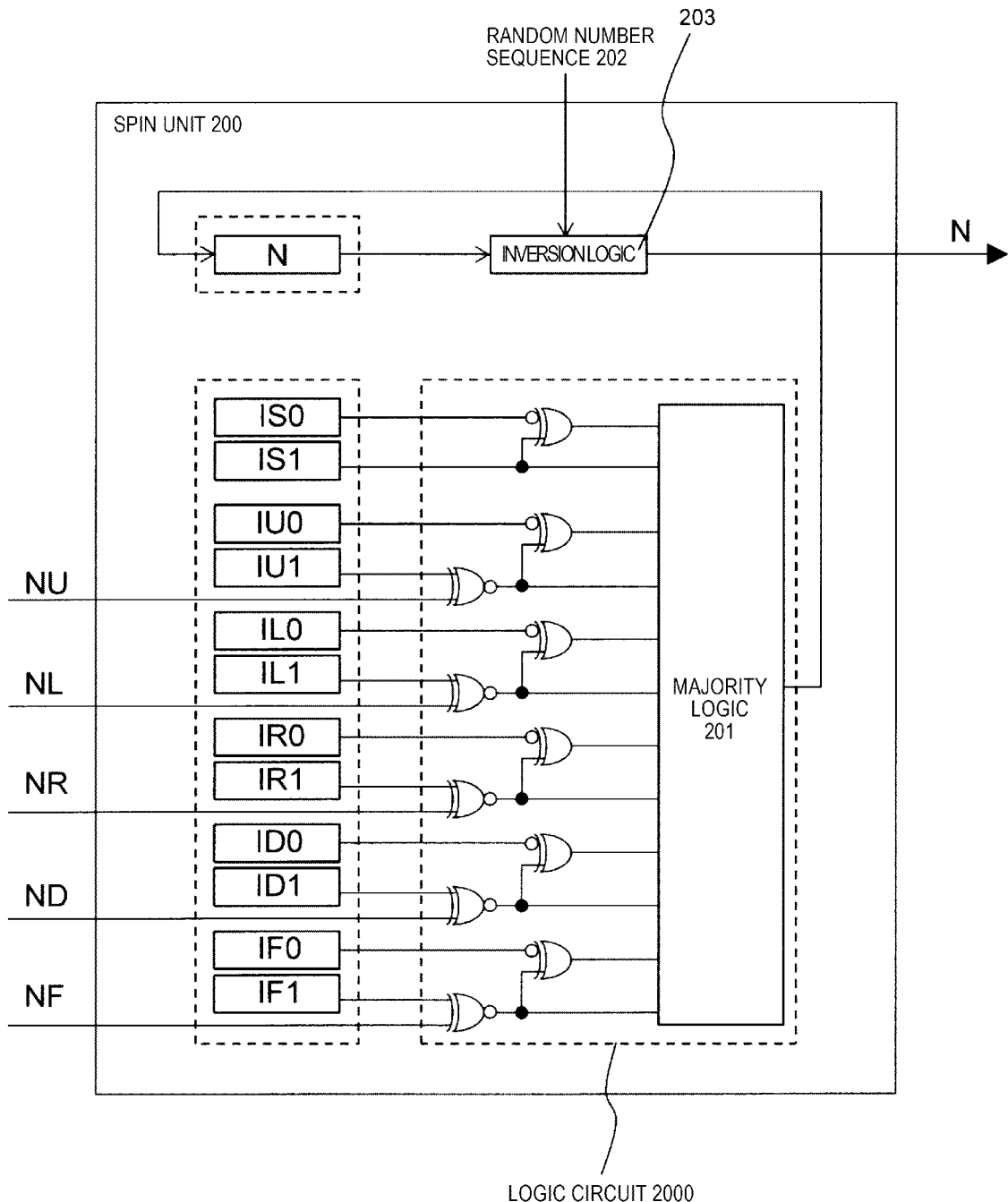

[Fig. 4]
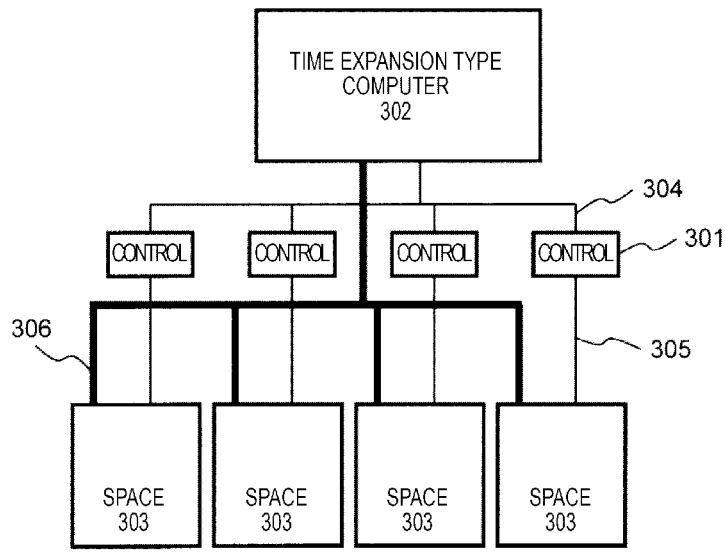
[Fig. 5]
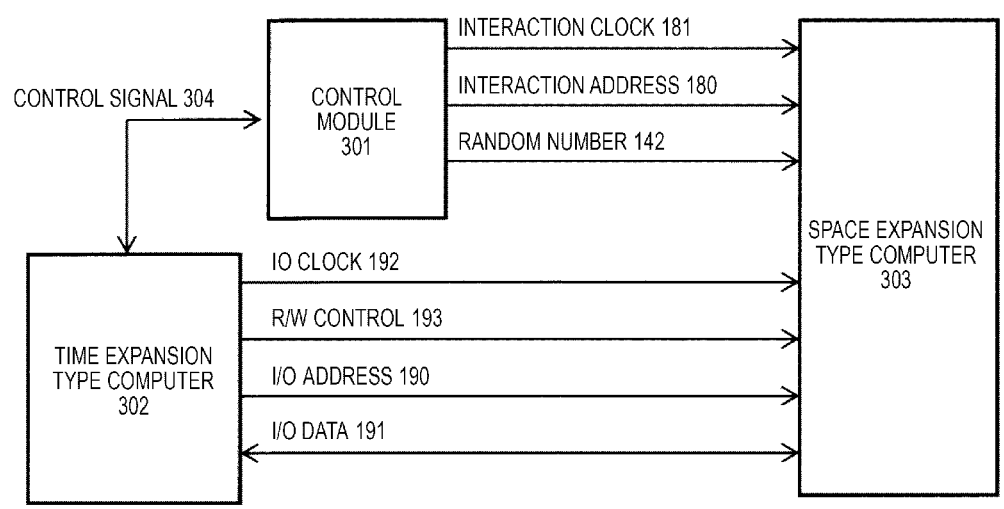

[Fig. 6]
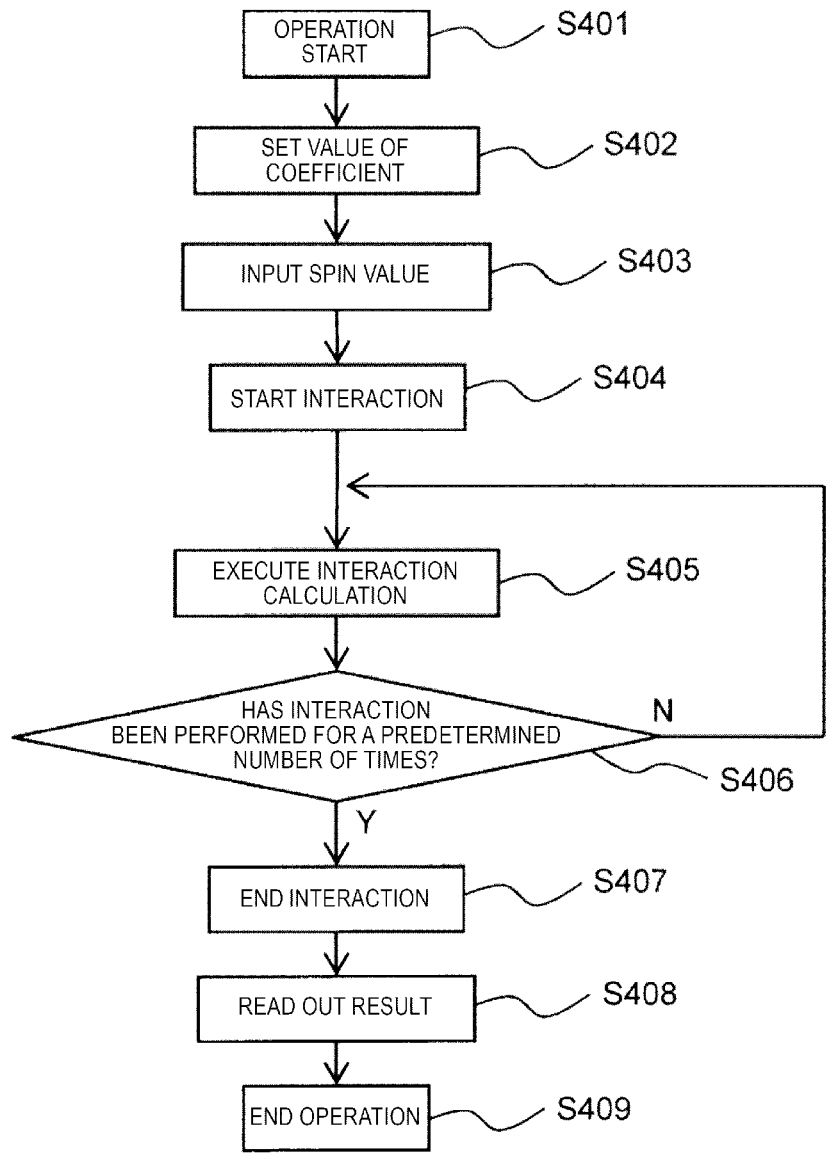

[Fig. 7]
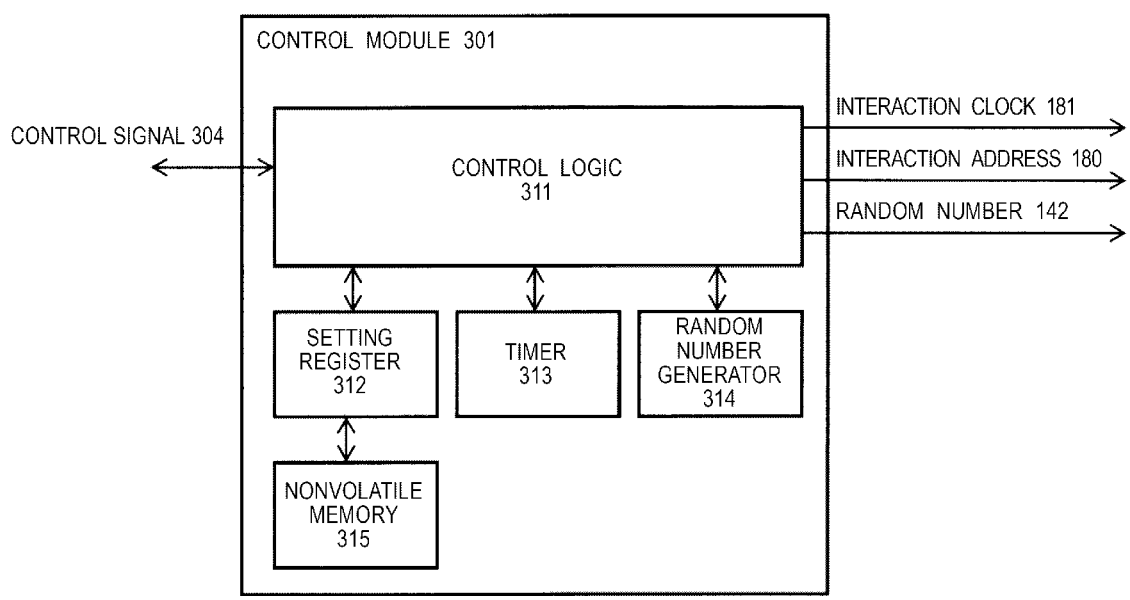

[Fig. 8]
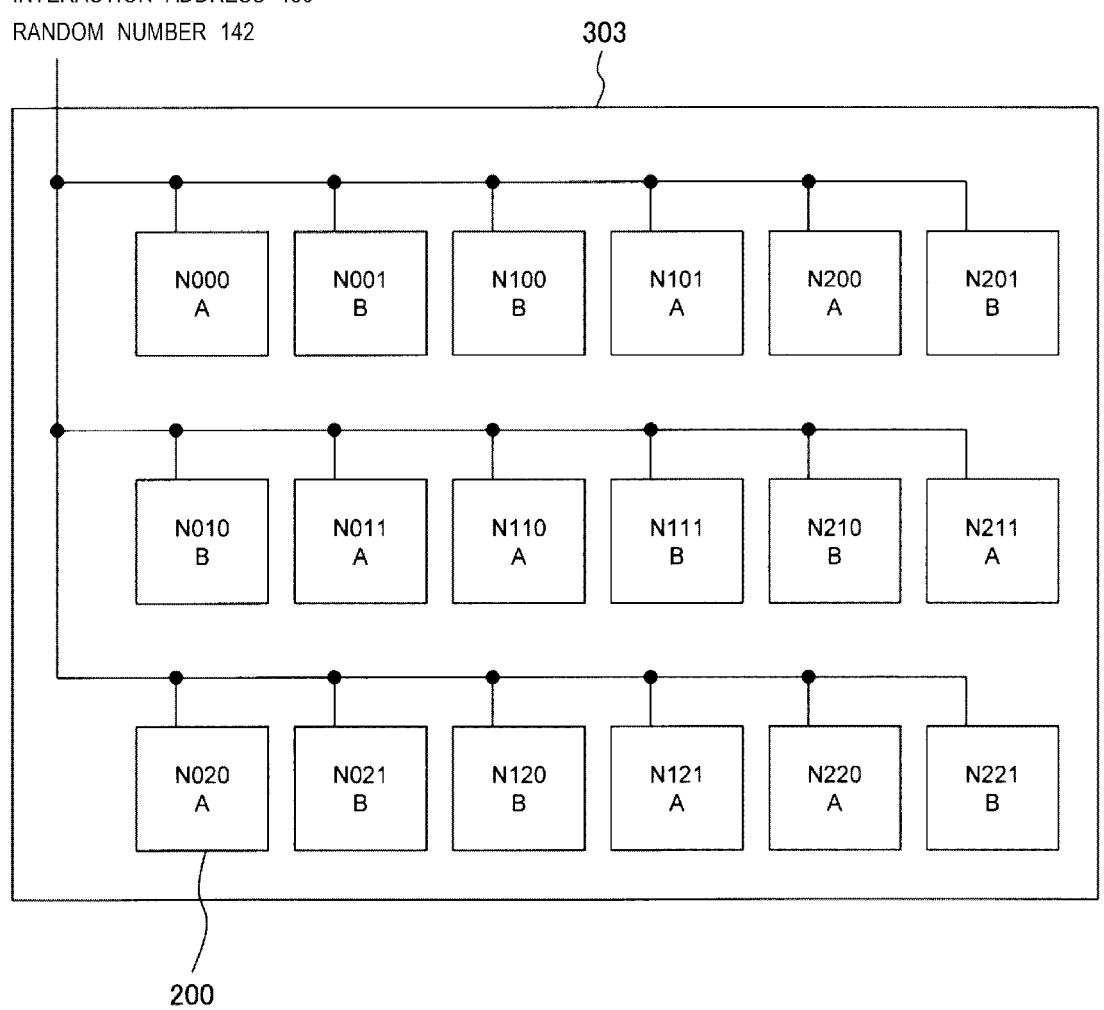

[Fig. 9]
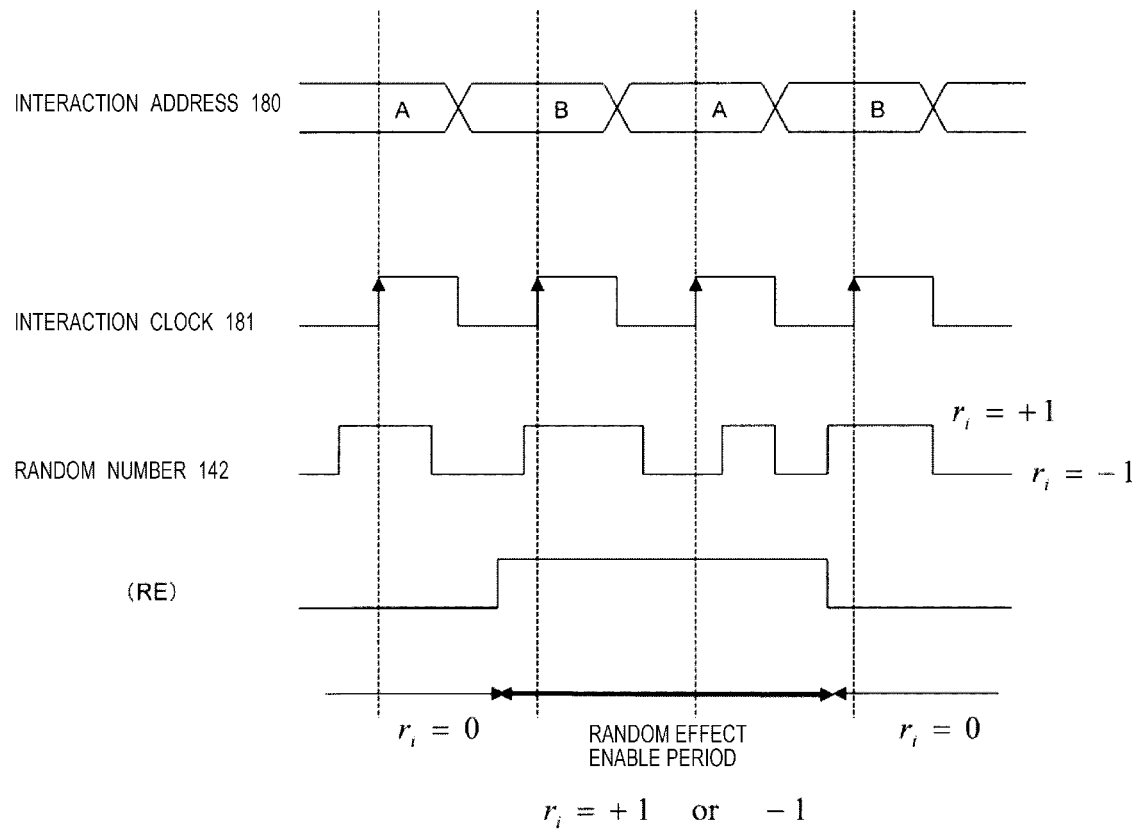

[Fig. 10]
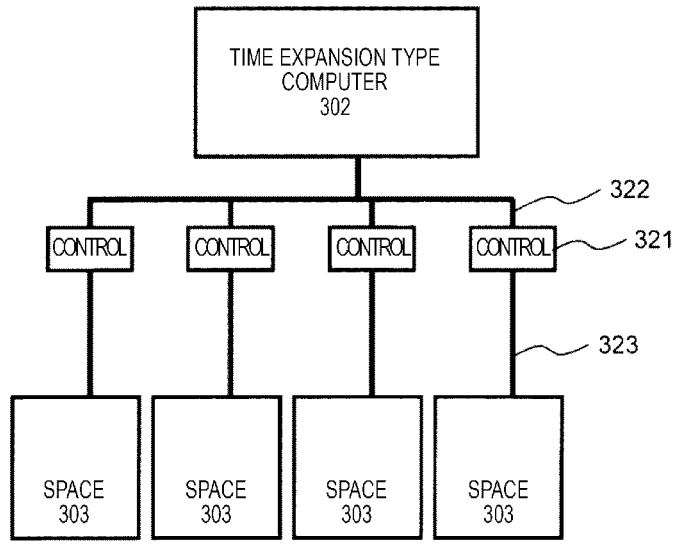
[Fig. 11]
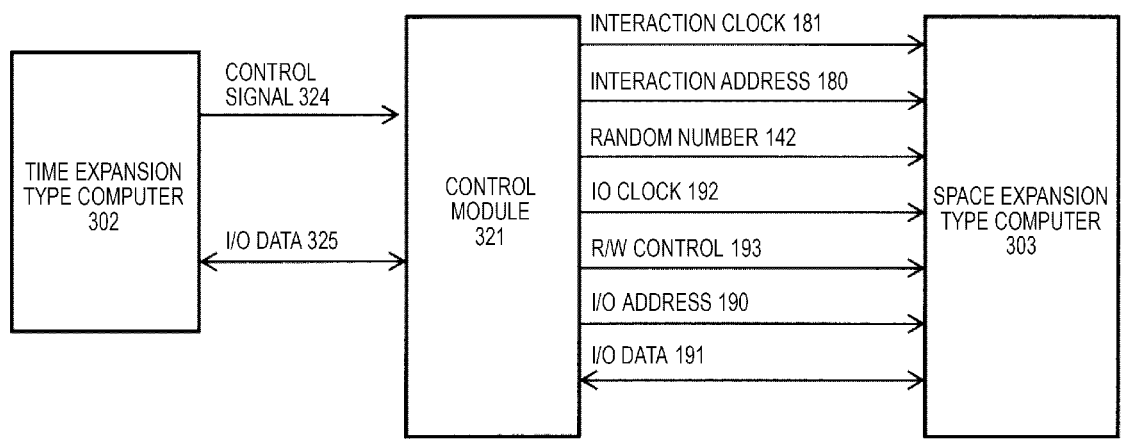

[Fig. 12]
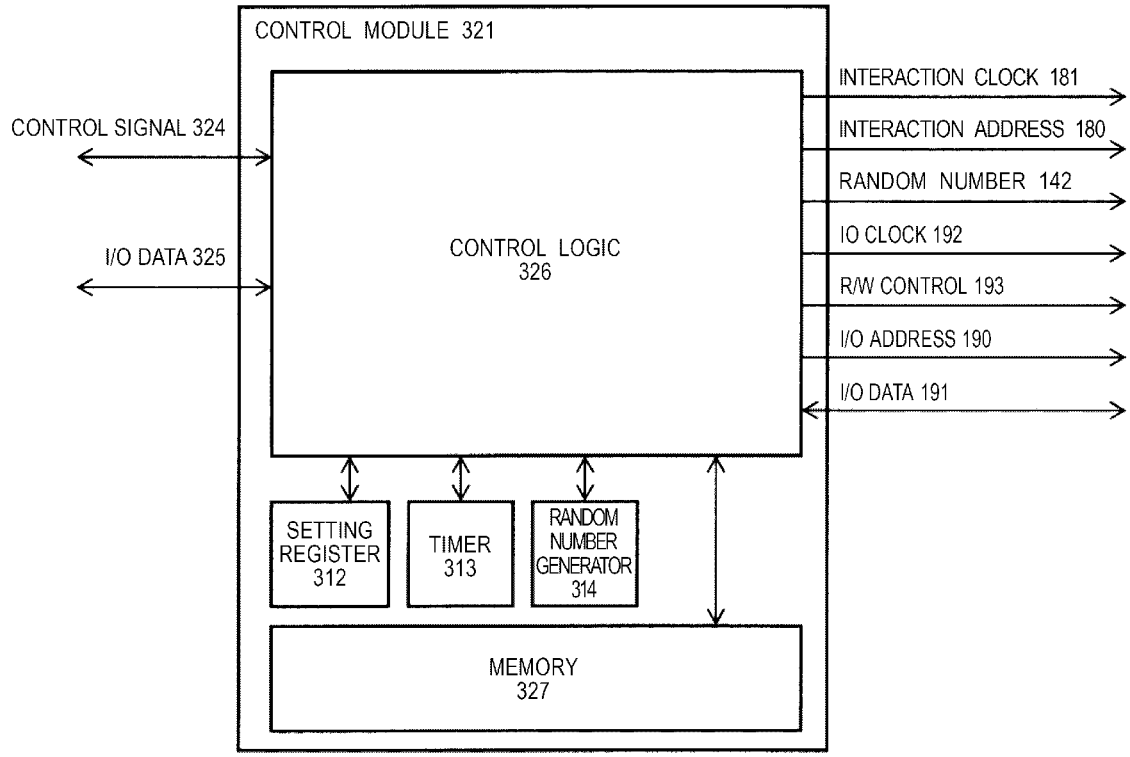
[Fig. 13]
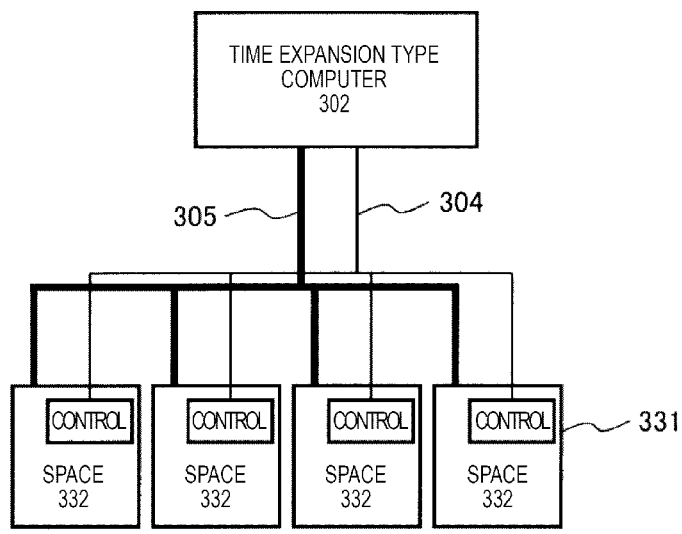

[Fig. 14]
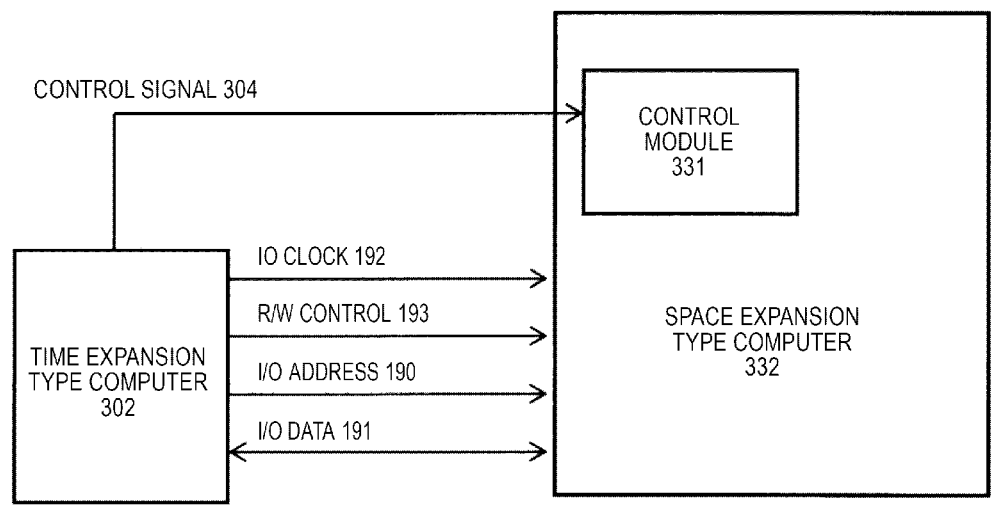
[Fig. 15]
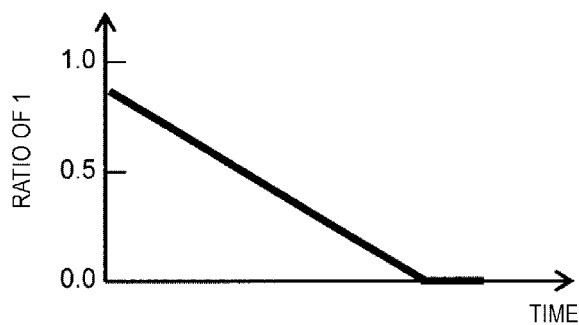

[Fig. 16]
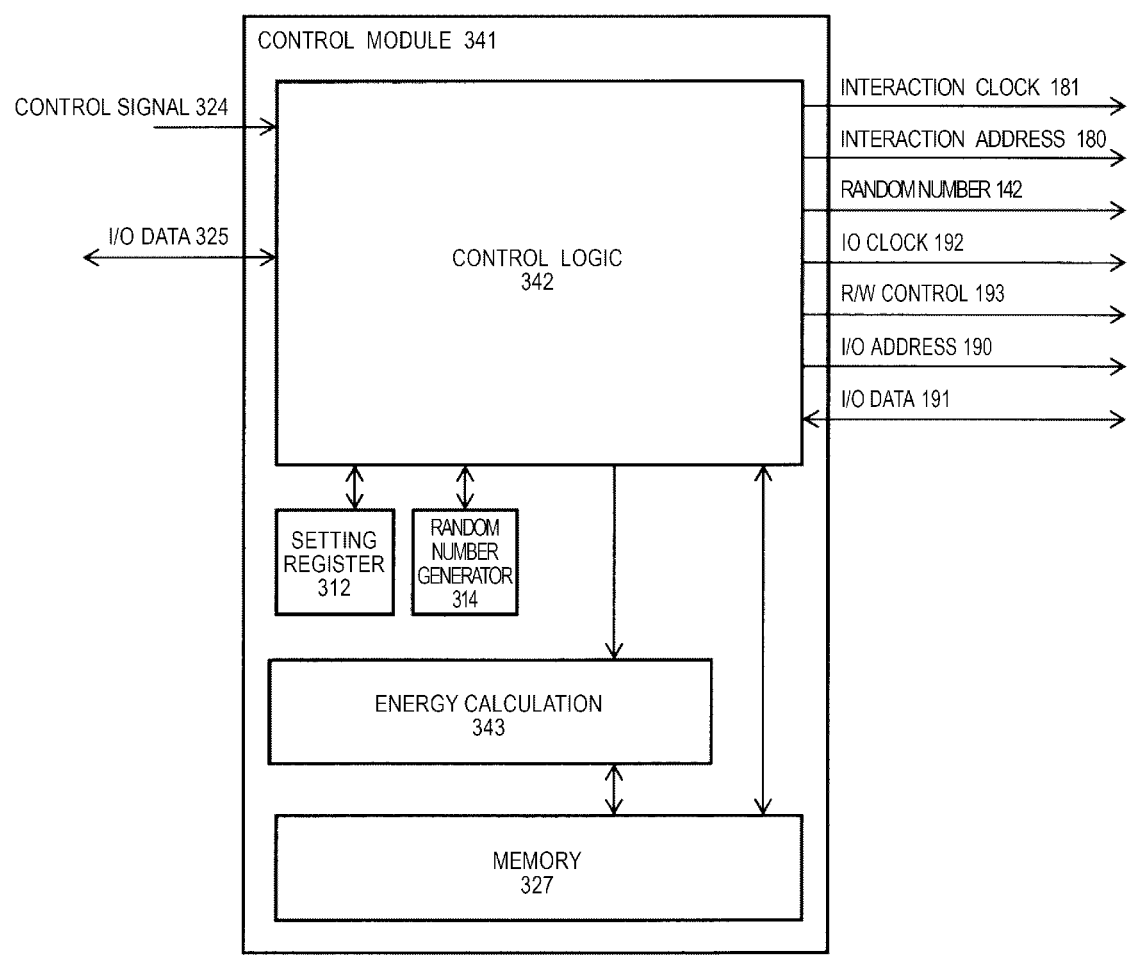

[Fig. 17]
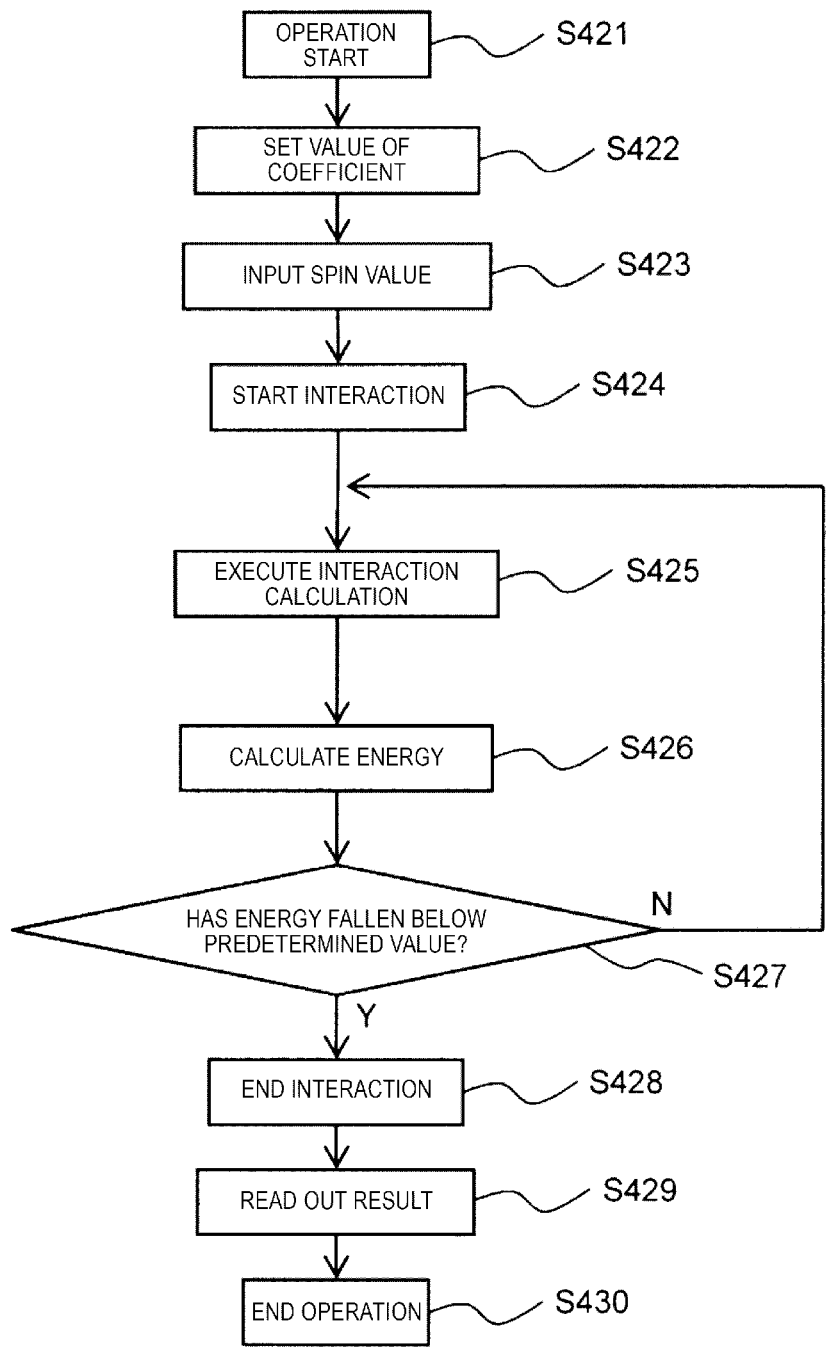

INFORMATION PROCESSING ACCELERATION CONTROL SYSTEM

TECHNICAL FIELD

The present invention relates to an information processing apparatus, and more particularly to an information processing apparatus that handles calculations such as an Ising model and a neuro model and an information processing system that controls the information processing apparatus as an accelerator.

BACKGROUND ART

Currently, the mainstream of computer architecture is a von Neumann type. In the von Neumann type architecture, its operation is defined by a program which is a sequential instruction sequence. By changing the program, it has versatility available for various purposes. Not only a central processing unit (CPU) that plays a central role of a computer but also a computing apparatus for a specific application such as a graphics processing unit (GPU) are configured with the von Neumann architecture, and the basic operations thereof are executed sequentially. A computer that sequentially executes instructions and solves the problem is referred to as "time expansion type computer" in the present specification, from a viewpoint that it develops a problem in a time direction.

Until now, performance improvement of a computer mainly depends on the improvement of a clock frequency. Since the basis of the von Neumann architecture is the sequential execution of the instruction sequence, if the instruction execution speed is increased, performance improvement can be expected. However, in general-purpose CPUs used in personal computers and servers, the improvement of a clock frequency has ceased at around 3 GHz in the early 2000s. In recent years, measures to realize performance improvement by a parallel process using multi cores are becoming a mainstream, in place of the clock frequency of which improvement has ceased.

In the parallel process using multi cores, performance is improved by finding parallel executable parts from the sequential instruction sequence (extraction of parallelism) and executing the parts in parallel. However, it is not easy to extract parallelism from a program in which sequential algorithms are written as instruction sequences. Instruction level parallelism (ILP) for extracting parallelism with the instruction level has already reached the limit, and in recent years, coarse grain parallelism as thread level parallelism (TLP) and data level parallelism (DLP) tends to be used.

In view of this situation, in order to improve the performance of the computer in the future, it is not based on the execution of the sequential instruction sequence as in the related art, but essentially, it is necessary to shift to a parallel information process. To do this, instead of a method of describing a problem based on the sequential instruction sequence in the related art, it is necessary to describe a problem suited for essentially realizing the parallel information process.

One candidate thereof is Ising model. The Ising model is a model of statistical mechanics to explain the behavior of magnetic materials, and is used for research on magnetic materials. The Ising model is defined as an interaction between sites (spins having two values of +1 and −1). It is known that determining the ground state of the Ising model where the topology becomes a nonplanar graph is an NP difficult problem. Since the Ising model expresses the problem with the interaction coefficient spreading in the spatial direction, there is a possibility that information processing using intrinsic parallelism can be realized.

By the way, since determining the ground state of the Ising model is an NP difficult problem as described above, it is difficult to obtain a solution using the von Neumann computer in terms of calculation time. Algorithms for introducing heuristics to increase speed have also been proposed. However, a calculation using a physical phenomenon more directly rather than the von Neumann type computer, that is, a method of rapidly obtaining the ground state of the Ising model by an analog computer has been proposed.

For example, there is an apparatus described in PTL 1 as such an apparatus. Such a computer solves a problem by expanding it in the spatial direction, not in the time direction, so it is referred to as "space expansion type computer" in this specification. Since the space expansion type computer applies a specific problem to a specific type and solve it, it is difficult to control its calculation process, and it is necessary to use a time expansion type general-purpose computer for the control.

In a case where the time expansion type computer controls the space expansion type computer, it is necessary for the time space type computer to recognize the extent of processing by the space expansion type computer, and perform control according to time. When a single time expansion type computer controls a single space expansion type computer, control corresponding to the space expansion type computer can be realized by executing control corresponding to the space type computer.

CITATION LIST

Patent Literature

PTL 1: Pamphlet of International Publication No. 2012/118064

SUMMARY OF INVENTION

Technical Problem

However, when a single time expansion type computer attempts to control a plurality of space expansion type computers, control in accordance with the operation of each space expansion type computer is required. For example, when changing the operation of each space expansion type computer in a state where a plurality of space expansion type computers are operating, time management for each space expansion type computer is performed continuously, and it is necessary to control the start and end of calculation of the space expansion type computer and to perform temperature scheduling according to the time. As the number of space expansion type computers increases, there is a problem that the time expansion type computer handles many resources to control all.

Solution to Problem

An aspect of the present invention for solving the above problem is a system including a first computer, a control module controlled by the first computer, and a second computer configured to be associated with the control module. The second computer includes a plurality of units, and each of the plurality of units includes a first memory that stores a value indicating a state of a node, a second memory that stores a coefficient, and an arithmetic circuit. The arithmetic circuit performs an arithmetic process of determining a value indicating a state of the node of its own unit, based on a value indicating a state of a node of a different unit and the coefficient of its own unit, and storing the determined value in the first memory, and the control module supplies a control signal for controlling the arithmetic process to the second computer.

Another aspect of the present invention is a system including a computer and a control module. The computer includes a plurality of units, and each of the plurality of units includes a first memory, a second memory, and an arithmetic circuit. The arithmetic circuit performs an arithmetic process of determining a value to be stored in a first memory cell of its own unit, based on the value stored in the first memory of a different unit and a value stored in the second memory of its own unit. The control module supplies a first control signal designating a memory and a second control signal designating a timing to the computer in order to control the arithmetic process.

Another aspect of the present invention is a system having a control unit separately from a space expansion type computer. In particular, when having a plurality of space expansion type computers, each of the space expansion type computers includes a control module. The control module executes time management of calculation execution and temperature control which is operation control of a space expansion type computer. The control module may be included in the time expansion type computer, the control module may be placed outside, or the control module may be mounted on the space expansion type computer.

Advantageous Effects of Invention

With the configuration of the present application, it becomes unnecessary for a space expansion type computer to perform fine control such as time management and temperature management of the space expansion type computer, and there is no need to waste resources of a time expansion type computer in order to control the space expansion type computer.

BRIEF DESCRIPTION OF DRAWINGS

FIG. 1 is a block diagram illustrating an example of a configuration of an Ising chip 100 in an embodiment.

FIG. 2 is a conceptual diagram for explaining an example of a configuration of a spin array 110 of a three-dimensional lattice.

FIG. 3 is a block diagram illustrating an example of a configuration of a spin unit 200.

FIG. 4 is a block diagram showing an overall configuration of a computer according to Embodiment 1.

FIG. 5 is a block diagram for explaining control signals of the computer according to Embodiment 1.

FIG. 6 is a flowchart showing an example of a processing flow of Embodiment 1.

FIG. 7 is a configuration block diagram of a control module 301 according to Embodiment 1.

FIG. 8 is a configuration block diagram showing a part relating to an interaction control interface 160 of a space expansion type computer 303 of Embodiment 1.

FIG. 9 is a graph showing an example of control signals supplied from the interaction control interface 160 of Embodiment 1 to the space expansion type computer 303.

FIG. 10 is a block diagram showing an overall configuration of a computer according to Embodiment 2.

FIG. 11 is a block diagram illustrating control signals of the computer according to Embodiment 2.

FIG. 12 is a block diagram showing a configuration of a control module 321 according to Embodiment 2.

FIG. 13 is a block diagram showing an overall configuration of a computer according to Embodiment 3.

FIG. 14 is a block diagram illustrating control signals of the computer according to Embodiment 3.

FIG. 15 is a graph showing an example of a concept of temperature scheduling.

FIG. 16 is a configuration block diagram of a control module 301 according to Embodiment 4.

FIG. 17 is a flowchart showing an example of a processing flow of Embodiment 4.

DESCRIPTION OF EMBODIMENTS

Embodiment 1

In the following embodiments, if necessary for the sake of convenience, a description will be made by separating the present invention into a plurality of sections or embodiments, but unless otherwise specified, they are not unrelated to each other, one is related to the modification example, details, supplementary explanation, or the like of a part or all of the other. Further, in the following embodiments, in a case of referring to the number of elements (including number, numerical value, quantity, range, or the like), except for a case where it is expressly specified, and a case where it is obviously limited to a specific number in principle, or the like, it is not limited to the specific number, and it may be the specific number or more or or less.

The notations such as "first", "second", "third", and the like in this specification are attached to identify constituent elements, and do not necessarily limit the number or order. In addition, the number for identifying the constituent element is used for each context, and the number used in one context does not necessarily indicate the same constituent element in other contexts. Further, it does not preclude that the constituent element identified by a certain number doubles as the function of the constituent element identified by another number.

The positions, sizes, shapes, ranges, and the like of the respective components shown in the drawings and the like may not show actual positions, sizes, shapes, ranges and the like in order to facilitate understanding of the invention. Therefore, the present invention is not necessarily limited to the positions, sizes, shapes, ranges, and the like disclosed in the drawings and the like.

Furthermore, in the following embodiments, it goes without saying that the constituent elements (including element steps or the like) are not essential, except for a case where they are expressly specified or a case where it is considered to be obviously essential in principle. Similarly, in the following embodiments, it is assumed that when referring to shapes, positional relationships, or the like of constituent elements, shapes which are substantially approximate or similar to the referred shape or the like are included, except for a case where they are expressly specified and a case where it is thought that they are not obvious in principle. This also applies to the above numerical values and ranges.

Hereinafter, an embodiment of the present invention will be described in detail with reference to the drawings. In addition, in all of the drawings for describing the embodiments, the same or related reference numerals will be given to the same members in principle, and the repetitive description thereof will be omitted. In the following embodiments, the description of the same or similar parts will not be repeated in principle unless it is particularly necessary.

In the present embodiment, as an example of a space expansion type computer, an example of an Ising chip 100 (FIG. 1) which is a semiconductor device for finding the ground state of the Ising model will be described.

The Ising model is a model of statistical mechanics to explain the behavior of a magnetic material. The Ising model is defined by a spin having binary values of +1 and −1 (or 0 and 1, up and down), an interaction coefficient indicating an interaction between spins, and an external magnetic field coefficient for each spin.

The Ising model can calculate the energy at that time, from the given spin arrangement, interaction coefficient, and external magnetic field coefficient. The energy function $E(\sigma)$ of the Ising model is generally expressed by the following equation (1).

[Equation 1]

$$E(\sigma) = -\sum_{(i,j)} j_{i,j}\sigma_i\sigma_j - \sum_i h_i\sigma_i \quad (1)$$

In addition, $\sigma_i$ and $\sigma_j$ represent the i-th and j-th spin values, respectively, $J_{i,j}$ represents an interaction coefficient between the i-th and j-th spins, $h_i$ represents the external magnetic field coefficient for the i-th spin, <i, j> is a combination of two adjacent sites, and σ represents the spin arrangement.

The ground state search of the Ising model is an optimization problem to find a spin arrangement that minimizes the energy function of the Ising model. For example, problems such as factorization and traveling salesman problem, which are irrelevant to magnetic materials at first glance, can be converted into Ising models. Then, the ground state of the Ising model obtained by the transformation corresponds to the solution of the original problem. From this, it can be said that a device capable of searching the ground state of the Ising model is a computer usable for general purpose.

FIG. 1 is a diagram for explaining an example of a configuration of an Ising chip 100 in the present embodiment. The Ising chip 100 includes a spin array 110, an input/output (I/O) driver 120, an I/O address decoder 130, and an interaction address decoder 140. In the present embodiment, the Ising chip 100 is described assuming that it is mounted as a complementary metal-oxide semiconductor (CMOS) integrated circuit which is now widely used, but other solid elements can also be realized.

The Ising chip 100 includes an SRAM compatible interface 150 for performing reading from and writing to the spin array 110. The SRAM compatible interface 150 includes an address bus 190, a data bus 191, an R/W control line 193, and an I/O clock line 192. This part is based on the configuration for read/write of the SRAM memory in the related art.

It also has an interaction address line 180 and an interaction clock line 181 as an interaction control interface 160 for controlling the ground state search of the Ising model. The interaction control interface 160 is an interface for controlling interaction calculation to be described later.

In the example of FIG. 1, the Ising chip 100 operates with the voltage supplied through the power supply line 142. In the Ising chip 100, the spin $\sigma_i$, the interaction coefficient $J_{i,j}$ and the external magnetic field coefficient $h_i$ of the Ising model are all represented by information stored in the memory cells in the spin array 110. In the example shown in FIG. 1, it is assumed that the memory cell is configured with a high-speed static random access memory (SRAM). In this case, in order to set the initial state of the spin $\sigma_i$ and to read the solution after completing the ground state search, the spin $\sigma_i$ is read/written by the SRAM compatible interface 150. In order to set the Ising model of which the ground state is to be searched in the Ising chip 100, the interaction coefficient $J_{i,j}$ and the external magnetic field coefficient $h_i$ are also read/written by the SRAM compatible interface 150. Therefore, the spin $\sigma_i$, the interaction coefficient $J_{i,j}$ and the external magnetic field coefficient $h_i$ of the spin array 110 are given addresses corresponding to the memory cells storing them.

Note that the address bus 190, the data bus 191 and the R/W control line 193 constituting the SRAM compatible interface 150 operate in synchronization with the clock input to the I/O clock line 192. However, in this embodiment, there is no need for the interface to be synchronous, and an asynchronous interface may be used. In the present embodiment, a description will be given assuming that it is a synchronous interface.

In addition, the Ising chip 100 realizes the interaction between spins in the spin array 110 in order to perform the ground state search. The interaction control interface 160 externally controls the interaction. More specifically, an address designating a memory storing the spin group to perform interaction is input through the interaction address line 180. Then, the spins stored in the designated memory interact with each other in synchronization with the clock input through the interaction clock line 181. In the example of the Ising chip, the interaction is an operation using the spin $\sigma_i$, the interaction coefficient $J_{i,j}$ and the external magnetic field coefficient $h_i$, and the storage of the result. Specifically, a series of processes for reading the value of the memory cell of the spin array, calculating the energy from the read value, determining the spin value such that the energy becomes small, and writing the determined spin value into the memory cell are performed.

It should be noted that the interaction does not necessarily have to be realized by a clock synchronization circuit, and may be an asynchronous circuit. In this case, it is assumed that the role of the interaction clock line 181 is not to input a clock but to input an enable signal that permits the execution of an interaction. A description will be given assuming that the interaction control interface is not necessarily required to be synchronous, but an asynchronous interface may be used, but in the present embodiment, a synchronous interface is used and interaction is performed in synchronization with the clock input through the interaction clock line 181.

The spin unit 200 implements holding of one spin and its associated interaction coefficient and external magnetic field coefficient and a ground state search process. The spin array 110 is configured by arranging a large number of spin units 200, with a spin unit 200 as a basic configuration unit.

FIG. 2 is a conceptual diagram for explaining an example of the configuration of the spin array 110 of a three-dimensional lattice. FIG. 2 shows an example in which a plurality of spin units 200 are arranged as a spin array 110 to construct an Ising model having a three-dimensional lattice topology.

The example in FIG. 2 is a three-dimensional lattice having a size of 3 (X-axis direction)×3 (Y-axis direction)×2 (Z-axis direction). The coordinate axes are defined as shown in FIG. 2, the X axis is the right direction of FIG. 2, the Y axis is the downward direction of FIG. 2, and the Z axis is the depth direction of FIG. 2. However, the coordinate axes are only necessary for the convenience of description of the embodiment, and are not related to the present embodiment. In the case of using a topology other than the three-dimensional lattice, for example, a tree-like topology, it is expressed by the number of stages of the tree or the like separately from the coordinate axis. In the three-dimensional lattice topology of FIG. 3, if the interaction between spins is obtained as a graph, a five-order-of spin (vertex) is required at maximum. Incidentally, considering the connection of the external magnetic field coefficient, the order 6 is required at the maximum.

The values of the spins $\sigma_j$, $\sigma_k$, $\sigma_l$, $\sigma_m$, and $\sigma_n$ of the adjacent spin units are input to the single spin unit 200 shown in FIG. 2. In the example of FIG. 2, these values indicate the values of five adjacent spin units in the up, down, left, right, and depth directions. The spin unit 200 includes a memory cell storing a spin $\sigma_i$ and an external magnetic field coefficient $h_i$. In the spin unit 200 of FIG. 2, the memory cells storing the spins are shown by circles, and the memory cells storing the external magnetic field coefficients are shown by squares. It also includes memory cells that hold $J_{j,i}$, $J_{k,i}$, $J_{l,i}$, $J_{m,i}$, and $J_{n,i}$ which are the interaction coefficients with the above-mentioned five adjacent spins $\sigma_i$. These are shown in FIG. 2 as rectangles.

Incidentally, the Ising model generally has an interaction expressed by an undirected graph. In the above equation (1), there is $J_{i,j} \times \sigma_i \times \sigma_j$ as a term representing the interaction, which indicates the interaction from the i-th spin to the j-th spin. At this time, in the general Ising model, there is no distinction between the interaction from the i-th spin to the j-th spin and the interaction from the j-th spin to the i-th spin. That is, $J_{i,j}$ and $J_{j,i}$ are the same. However, in the Ising chip 100 of the present embodiment, the Ising model is expanded to a directed graph to make the interaction from the i-th spin to the j-th spin and the interaction from the j-th spin to the i-th spin asymmetric. Thus, the expressive capability of the model is increased, and many problems can be expressed with a smaller model.

Therefore, when considering one spin unit 200 as the i-th spin $\sigma_i$, $J_{j,i}$, $J_{k,i}$, $J_{l,i}$, $J_{m,i}$, and $J_{n,i}$, which are the interaction coefficients held by the spin unit, are used to determine the interaction from the adjacent j-th, k-th, l-th, m-th, and n-th spins $\sigma_j$, $\sigma_k$, $\sigma_l$, $\sigma_m$, and $\sigma_n$ to the i-th spin $\sigma_i$. This means that in FIG. 2, the arrows (interactions) corresponding to the interaction coefficients included in the spin unit 200 correspond to heading from the spins outside the illustrated spin unit 200 to the spins inside the spin unit 200.

An example of a specific configuration of the spin unit 200 will be described with reference to FIG. 3. Since the spin unit 200 holds the spin $\sigma_i$, interaction coefficient $J_{j,i}$ to $J_{n,i}$, and external magnetic field coefficient $h_i$ of the ising model, it has a plurality of memory cells N, IU0, IU1, IL0, IL1, IR0, IR1, ID0, ID1, IF0, IF1, IS0, and IS1. Though not shown in FIG. 3, the memory cells have a data holding unit including two CMOS inverters like the SRAM, and realizes data reading from and writing to the data holding unit, by controlling pass gate transistors connected to both ends of the data holding unit through word lines and bit lines, which are also not illustrated. A method of reading from and writing to a desired memory cell using a word line and a bit line follows the configuration of an SRAM in the related art. That is, the Ising chip of the present embodiment basically has a structure of a memory cell array. In the present embodiment, a high-speed SRAM configuration is employed, but other types of memories can also operate.

In the Ising model, the spin values are +1 and −1 (+1 is expressed by up and −1 is expressed by down), but correspond to 0 and 1 which are the binary values of the memory cell N. For example, +1 corresponds to 1, −1 corresponds to 0.

In the present embodiment, the external magnetic field coefficient and the interaction coefficient are associated with three values of +1, 0, −1. Therefore, in order to express the external magnetic field coefficient and the interaction coefficient, 2-bit memory cells are used, respectively. As shown in FIG. 3, IS0, IS1, IU0, IU1, IL0, IL1, IR0, IR1, ID0, ID1, IF0, and IF1 indicate three values of +1, 0, and −1, with a combination of two memory cells with the last digit 0 and 1 (for example, IS0 and IS1 in the case of the external magnetic field coefficient ISX). For example, in the case of the external magnetic field coefficient ISX, IS1 indicates +1 or −1 (when IS1 is 1, it indicates +1, and when IS1 is 0, it indicates −1). In addition, when the IS0 is 0, the external magnetic field coefficient is regarded as 0, and when IS0 is 1, one of +1 and −1 determined by IS1 is set as the external magnetic field coefficient. Considering that the external magnetic field coefficient is disabled when the external magnetic field coefficient is 0, it can be said that IS0 is the enable bit of the external magnetic field coefficient (the external magnetic field coefficient is enabled when IS0=1). Likewise, in IU0, IU1, IL0, IL1, IR0, IR1, ID0, ID1, IF0, and IF1 expressing the interaction coefficients, coefficients and bit values are associated with each other.

In the spin unit 200, the next state of the spin that performs the interaction calculation so as to minimize the energy between adjacent spins or spins which are away from each other is determined. In the example of FIG. 3, NU, NL, NR, ND, and NF indicate lines connected to spin units adjacent in the up, left, right, down, and depth directions, respectively, and receive signals about the spin values (state) read out from each spin unit. The signal indicated by N is a line for transmitting the spin value stored in the memory cell N to the adjacent spin unit. In this manner, the spin units are configured to transmit and receive the spin values of each other, but the connection may be configured to reproduce, for example, a model assumed as shown in FIG. 2.

The logic circuit 2000 shown in the spin unit 200 of FIG. 3 is a circuit for performing the above-described interaction. First, the exclusive OR of the state of the spins which are adjacent to each other or away from each other and the value indicating the interaction coefficient, which is held in the memory cell, is obtained by an exclusive OR circuit.

This makes it possible to calculate the next state of the spin that minimizes energy when considering only the interaction. When the interaction coefficient is only +1 and −1, if the majority logic circuit 201 determines which of +1 and −1 of the outputs of the exclusive OR circuit is more by the majority logic, the next state of the spin can be determined. Considering that the external magnetic field coefficients stored in IS0 and IS1 always correspond to the interaction coefficient with the spin of the state +1, the value of the external magnetic field coefficient is simply set to a value to be input to the majority logic circuit 201 which determines the next state of the spin. The next state of the spin calculated in this way is stored (overwritten) in the memory cell N, and one interaction calculation is completed.

By minimizing energy by repeating the interaction calculation between spins a plurality of times, the ground state search of the applied Ising model can be realized. However, there is a possibility that it will fall into a local optimum solution by itself. Basically, since there is only movement in the direction of decreasing energy, once falling into a local optimum solution, it cannot escape from it and does not reach the global optimum solution. Therefore, as an operation for escaping from the local optimum solution, a method of stochastically inverting the value of the memory cell expressing the spin is also used.

As a specific example, the random number 142 is input to the spin unit 200, and in a case where the value is 1, the value is inverted by the inversion logic 203. Thus, it is possible to obtain a low energy value as much as possible without stacking it on local optimization. The appearance frequency of 1 or 0 of the random number value corresponds to the temperature at the time of convergence calculation of the space expansion type computer. That is, in a case where the temperature in the convergence calculation is high (the overall energy is high), the frequency of occurrence of 1 is increased, and when the temperature is low (the overall energy is low), the frequency of occurrence of 0 is increased. That is, the appearance frequency of 1 or 0 of the random number is changed by one method of controlling the temperature. Specifically, in the process of repeating the interaction calculation a plurality of times, the random number 142 may be controlled so as to increase the frequency of occurrence of 1 at the beginning and increase the frequency of occurrence of 0 at the end.

The interaction calculation described above may be performed so that the spin units 200 in the spin array 110 are executed one by one. However, this method has a disadvantage that calculation is time consuming. Therefore, it is conceivable that the interaction between the spins is performed concurrently for all the spins. However, in actual interaction calculation, it is not preferable to simultaneously perform interaction calculation between a certain spin unit that performs the interaction calculation and a different spin unit that inputs the spin value to the certain spin unit. When updating a certain spin, the spin is updated so as to minimize the energy to and from the adjacent spin based on the value of the adjacent spin, so if the value of the adjacent spin is updated at the same time, both updates are duplicated, and energy cannot be minimized and it vibrates. That is, when updating a certain spin, it is necessary to avoid simultaneously updating a different spin connected to the certain spin (a spin directly connected through the interaction coefficient to the certain spin is hereinafter referred to as the adjacent spin).

For this reason, for example, a method is conceivable in which spin units in the spin array are divided into groups such that adjacent spins are not updated at the same time and only one group is simultaneously updated at a time. The group is sequentially updated. Therefore, in the interaction calculation, the interaction control interface 160 controls the address and timing of the spin unit that performs the interaction calculation.

As described above, the computer using the Ising model described in FIGS. 1 to 3 can be said to be a space expansion type computer because it solves the problem by expanding it in the spatial direction. In this specification, the computer using the Ising model is described assuming that the computer is a space expansion type computer, but the same effect can be obtained with a computer not using the Ising model. For example, a neuro computer simulating the work of a neuron is considered as a space expansion type computer as well, but it is necessary for the time expansion type computer to control the neuro computer in the same way, and the same effect can be achieved by the configuration of the present application.

FIG. 4 shows an example of the overall configuration of a computer configured with a time expansion type computer and a space expansion type computer. In this example, four space expansion type computers are controlled by a single time expansion type computer. The time expansion type computer 302 is, for example, a von Neumann type commercial CPU, and the space expansion type computer 303 is, for example, the Ising chip described above.

The space expansion type computer 303 of this embodiment is assumed to perform the ground state search of the Ising model described above. In general, in the ground state search, the same problem is solved a plurality of times and the best solution (for example, a solution with the lowest energy) is adopted. At this time, if the plurality of ground state searches can be executed in parallel, an improvement in throughput is expected. In this case, the space expansion type computers 303 do not necessarily operate in synchronism with each other, and may operate separately and independently from each other. For example, when one ground state search is completed by one space expansion type computer, the second ground state search can be started by the space expansion type computer for the same problem, regardless of the situation of a different space expansion type computer. Therefore, in the present embodiment, it is advantageous to dispose as many space expansion type computers 303 as possible.

The time expansion type computer 302 and the space expansion type computers 303 are directly connected by data lines 306 through which data is exchanged. Further, control modules 301 are connected to the time expansion type computer 302 through control signals 304. Further, the control modules 301 are connected to the space expansion type computers 303 one-on-one through the control signals 305.

With this configuration, data to be calculated by the space expansion type computer 303 is transferred directly from the time expansion type computer 302 to the space expansion type computer 303, and the calculation result is transferred directly from the space expansion type computer 303 to the time expansion type computer 302. As the data, there are coefficients such as the aforementioned interaction coefficient, external magnetic field coefficient and the like. Further, the spin value may be transferred as necessary.

On the other hand, when controlling the space expansion type computer 303, a signal indicating control is transmitted from the time expansion type computer 302 to the control module 301 as the control signal 304. Based on the control signal 304, a signal 305 for controlling the space expansion type computer 303 is transmitted from the control module 301 to the space expansion type computer 303. When the calculation by the space expansion type computer 303 is completed, a signal indicating that calculation is completed is transmitted from the control module 301 to the time expansion type computer 302 through the control signal 304.

A more detailed breakdown of these signals is shown in FIG. 5. As signals for transmitting and receiving data transmitted from the time expansion type computer 302 to the space expansion type computer 303, there are a clock signal 192 used for data IO, an R/W control signal 193 for selecting the data IO of the space expansion type computer, and an IO address 191 for designating an address for data IO, and the signals are transmitted from the time expansion type computer 302 to the space expansion type computer 303.

The data transmitted from the time expansion type computer 302 to the space expansion type computer 303 is problem data, and includes, for example, an interaction coefficient and an external magnetic field coefficient. These problem data are stored in the predetermined memory cell shown in FIG. 3 according to the model structure shown in FIG. 2. The storage process may follow the write operation into a general SRAM. In addition, it is possible to set the spin value as necessary and make it a part of the problem data. Alternatively, the initial spin value may be set randomly.

The data transmitted from the space expansion type computer 303 to the time expansion type computer 302 is solution data and is a spin value stored in the memory cell N in FIG. 3 after a plurality times of interaction calculation. The readout process may follow the read operation from a general SRAM. In this manner, the data used in the space expansion type computer 303 and the calculation result by the space expansion type computer 303 are transmitted and received as the IO data 191.

Further, an interaction clock 181 for the calculation by the space expansion type computer 303 by itself, an interaction address 180 indicating an address at which the interaction is performed, and a random number 142 for indicating the state of temperature as necessary are input from the control module 301 to the space expansion type computer 303.

More specifically, when the space expansion type computer 303 actually operates, problem data 191 for calculation is first transferred from the time expansion type computer 302 to the space expansion type computer. The problem data is data corresponding to external magnetic field coefficients and interaction coefficients of the Ising model, and these data are written into memories storing the interaction coefficient of the Ising model (IS0, IS1, IU0, IU1, IL0, IL1, IR0, IR1, ID0, ID1, IF0, and IF1 of FIG. 3). Further, the initial value of the spin value is written.

Next, an instruction for executing the interaction calculation is transmitted from the time expansion type computer 302 to the control module 301 through the control signal 304. At this time, setting data indicating how much time is to be spent for calculation by the space expansion type computer 303 (how many times the interaction calculation is to be performed) and how to change the temperature (how to change the generation condition of the random numbers) can also be transmitted to the control module 301.

The control module 301 transmits the clock 181 for executing the interaction of the Ising model to the space expansion type computer 303, and generates and inputs the address 180 of the spin unit for executing the interaction. The space expansion type computer 303 performs calculation, using the clock 181 and the address 180. As described above, it is desirable that the spin units that performs the interaction calculation are selected so as not to interfere with each other.

In addition, the control module 301 manages the time of calculation (or the number of interaction calculations) performed in the space expansion type computer 303, and changes the temperature state, that is, the frequency of 1 or 0 included in the random number 142, according to the time. With respect to the temperature change, it is possible to perform a change based on the setting information transmitted from the time expansion type computer 302.

In the present embodiment, a configuration called a module can be a configuration in which a predetermined process is performed in cooperation with other hardware, by a processor executing the program stored in a memory, in a so-called microcomputer equipped with an input and output device, a processing device, and the memory. Alternatively, functions equivalent to the functions configured by the software can be realized by hardware such as field programmable gate array (FPGA) and application specific integrated circuit (ASIC). In the present embodiment, any configuration can be adopted.

FIG. 6 shows an example of the overall operation flow of the system of FIG. 4. The start of the operation can be executed in response to an instruction by the operator to the time expansion type computer 302 or automatically (S401). Using the IO address 190, the IO clock 192, and the IO data 191, from the time expansion type computer 302, the interaction coefficient data is transmitted to the space expansion type computer 303, and the value of the coefficient is set (S402). Further, in some cases, similarly, the spin value is also input (S403).

Next, a control signal 304 is transmitted from the space expansion type computer 303 to the control module 301, and interaction calculation is started in each time expansion type computer 302 (S404). During the interaction calculation, a clock 181 and an address 180 for interaction and a random number 142 are supplied from the control module 301, and interaction is executed (S405). In the control module 301, it is checked whether or not interaction is performed a predetermined number of times (S406). If it is not performed the predetermined number of times, the process returns to S405 and interaction calculation is executed. In a case where it is performed the predetermined number of times, the control module 301 notifies the time expansion type computer 302 that the operation is ended (S407). Along with this, the time expansion type computer 302 reads out the calculation result 191 from the data line, using the IO clock 192 and the address 190 (S408).

The above operations of S404 to S408 correspond to one ground state search. In the present embodiment, the above-described operations of S404 to S408 are independently performed by a plurality of space expansion type computers 303. Normally, the ground state search is performed a plurality of times, and the best result is adopted. Therefore, each space expansion type computer 303 is configured such that once the operation is ended (S409), the process returns to S403 again, and the ground state search is repeated. The result is accumulated in the time expansion type computer 302 sequentially in S408, Finally, the best solution may be selected.

FIG. 7 shows the internal configuration of the control module 301 necessary for executing these operations. The control module 301 includes a setting register 312 that holds the setting data transmitted from the time expansion type computer 302, a timer (or a counter) 313 that manages the time and temperature during which the space expansion type computer 303 is operating, a random number generator 314 that generates a random number to be used, and a nonvolatile memory 315 that holds data specific to each chip. The control logic module 311 generates an interaction clock 181, an interaction address 180, and a random number 142, based on the information on these constituent elements.

When the calculation by the space expansion type computer 303 is completed, the time expansion type computer 302 is notified that the calculation is completed through the control signal 304. Since the nonvolatile memory 315 holds information specific to the chip of the space expansion type computer, it is possible to set the control signal of the space expansion type computer 303 according to the chip. For example, if the maximum operating frequency of the corresponding space expansion type computer 303 is held, by generating and inputting a clock corresponding to the maximum operating frequency, the space expansion type computer 303 can operate at maximum speed.

As described above, by using the present embodiment, the control module 301 can execute the calculation of the space expansion type computer 303, and it is possible to suppress the resources of the time expansion type computer 302 for controlling the space expansion type computer 303.

FIG. 8 is a block diagram showing the spin unit 200 inside the space expansion type computer 303 controlled by the control module 301. As described above, in the present embodiment, the interaction calculation of each spin unit is controlled so as not to interfere with each other. In the example of FIG. 8, the spin unit is divided into two groups A and B, and interaction calculation is performed alternately.

The interaction clock 181, the interaction address 180, and the random number 142, from the control module 301, are distributed to each spin unit 200. The signals from the control module 301 may be used as they are, or they may be used by adjusting the phase and frequency thereof. Though these signal lines are configured independently, they are shown by one line in FIG. 8 for the sake of convenience. IDs such as "N000" and codes of A and B are attached to the spin units 200. A and B indicate groups which are alternately interacted by the interaction address decoder 140 so that adjacent spins are not rewritten at the same time.

FIG. 9 shows control signals input to the spin unit of FIG. 8. The interaction address 180 and the interaction clock 181 cause groups A and B of the spin unit to perform interaction calculation alternately. The random number 142 indicated by ri[t] is not limited to 1 bit, but in this example, it is a 1 bit pulse having values of +1 and −1. This signal can be generated by the normal random number generator 314 in the control module 301.

The random effect control signal (RE) enables the random number 142 while this signal is HIGH and disables it during LOW. While the random number 142 is invalid, the value of ri[t] is 0, and while it is valid, the value of ri[t] has a random value of +1 or −1. Normally, at the initial stage of the ground state search, the random number 142 is validated. If necessary, the random effect control signal RE can be supplied from the control module 301 to the space expansion type computer 303. The space expansion type computer 303 inverts the value of the memory cell N according to the value of the random number.

The random effect control signal (RE) and the random number signal 142 of FIG. 7 are input to the space expansion type computer 303, a logical sum with the random number 142 is generated, and it is possible to control (mask) the validity and invalidity of the random number. Further, instead of masking random numbers by supplying the random effect control signal (RE) to the space expansion type computer 303, the random number 142 may be masked in the control logic module 311 of the control module 301, and the masked random number may directly be supplied to the space expansion type computer 303.

In the present embodiment, an example of Ising chip is shown as the space expansion type computer, but it is not necessarily limited to Ising chip. For example, in a neuro-computer, which is a space expansion type computer having a neural network, control of data input and output signals, clock signals in a case of a synchronous type, and communication between chips is performed by an external space expansion type computer. In the neural network, the coefficients of the Ising model can be replaced with parameters representing the behavior of neurons, such as weights and bias parameters. For the sake of convenience in the present specification, these coefficients and parameters may be collectively referred to as "coefficient" in some cases.

Embodiment 2

In Embodiment 1, the control module 301 has nothing to do with the data to be transmitted from the time expansion type computer to the space expansion type computer. However, data transmission and reception can also be executed by the control module. In Embodiment 2, the aspect in that case will be described.

FIG. 10 shows an overall configuration of a computer configured with the time expansion type computer 302 and the space expansion type computer 303. Four space expansion type computers are controlled by one time expansion type computer. The difference from FIG. 4 is that both the control signal and the calculation data to be executed by the space expansion type computer are transmitted from the time expansion type computer 302 to the control module 321. From these data and control signals 322, the control module 321 transmits calculation data and control signals 323 to the space expansion type computer.

FIG. 11 shows details of data and control signals. From the time expansion type computer 302, a signal 324 for control and IO data 325 for calculation are transmitted to the control module 321. Further, an interaction clock 181 for the interaction calculation by the space expansion type computer by itself, an interaction address 180 indicating an address at which the interaction is performed, and a random number 142 for indicating the state of temperature are input from the control module 321 to the space expansion type computer 303. Further, there are a clock signal 192 used for data IO, an R/W control signal 193 for selecting the data IO of the space expansion type computer, and an IO address 191 for designating an address for data IO, and the signals are transmitted from the control module 321 to the space expansion type computer 303.

When the space expansion type computer 303 operates, first, data 325 for calculation is transferred from the time expansion type computer 302 to the control module 321. The data is data corresponding to the interaction coefficient of the Ising model. Further, the data is transmitted from the control module 321 to the space expansion type computer 303 as the data 191. The data is written into the memory that stores the interaction of the Ising model, using the IO address 191, the clock signal 192, and the R/W control signal 193, as in Embodiment 1.

Next, an instruction for executing the calculation is transmitted from the time expansion type computer 302 to the control module 321 through the control signal 324. At this time, the setting data is also transmitted to the control module 321. The setting data includes, for example, data for setting how much time is to be spent for interaction calculation by the space expansion type computer 303. Alternatively, the setting data may be data for setting how many times interaction calculation is performed. Further, data for setting how to change the temperature may be included. Specifically, the temperature setting data includes, for example, data for setting the start and stop of generation of a random number. Alternatively, data for temporally controlling the ratio between 0 and 1 included in the random number may be included.

The control module 321 transmits the clock 181 for executing the interaction of the Ising model to the space expansion type computer 303, and generates and inputs the address 180 for executing the interaction. The space expansion type computer 303 performs interaction calculation, using these clocks and address signals. In addition, the control module 321 manages the time of calculation performed in the space expansion type computer 303, and changes the temperature state, that is, the frequency of 1 or 0 included in the random number 142, according to the time. With respect to the temperature change, it is possible to perform a change based on the setting information transmitted from the time expansion type computer.

FIG. 12 shows an internal configuration of the control module 321 necessary for executing these operations. The control module 321 includes a setting register 312 that holds the setting data transmitted from the time expansion type computer 302, a timer 313 that manages the time and temperature during which the space expansion type computer is operating, a random number generator 314 that generates a random number to be used, and a memory that temporarily holds data used in the space expansion type computer and a result of the space expansion type computer. The control logic module 326 generates an interaction clock 181, an interaction address 180, and a random number 142, based on the information on these constituent elements.

When exchanging data with the space expansion type computer 303, the I/O clock 192, the R/W control signal 193, and the IO address 190 are generated. When the calculation by the space expansion type computer is completed, the I/O clock 192, the R/W control signal 193, and the IO address 190 are generated, the calculation result is read from the space expansion type computer and stored in the memory 327, and the time expansion type computer is notified that the calculation is completed through the control signal 304. At the same time, the calculation result held in the memory 327 is transferred to the time expansion type computer 302 through the I/O data 325.

As described above, by using the present embodiment, the control module can execute the calculation of the space expansion type computer, and it is possible to suppress the resources of the time expansion type computer for controlling the space expansion type computer.

Embodiment 3

In Embodiment 1, the control module 301 is disposed as a module separate from the time expansion type computer and the space expansion type computer. However, this module can be included in the time expansion type computer or the space expansion type computer. In Embodiment 3, an aspect of a case where it is included in the space expansion type computer will be described as an example.

FIG. 13 shows an overall configuration of a computer configured with the time expansion type computer and the space expansion type computer. Four space expansion type computers are controlled by one time expansion type computer. The difference from FIG. 4 is that the control module 331 is included in the space expansion type computer 332. The control signal 304 and the data 305 are transmitted directly to the space expansion type computer 332 from the time expansion type computer 302.

A more detailed breakdown of these signals is shown in FIG. 14. As signals for transmitting and receiving data transmitted from the time expansion type computer 332 to the space expansion type computer 303, there are a clock signal 192 used for data IO, an R/W control signal 193 for selecting the data IO of the space expansion type computer, and an IO address 190 for designating an address for data IO, and the signals are transmitted from the time expansion type computer 302 to the space expansion type computer 332. Further, the data used in the space expansion type computer 332 and the calculation result by the space expansion type computer 332 are transmitted and received among computers, as the IO data 191.

When the space expansion type computer actually operates, first, data for calculation is transferred from the time expansion type computer 302 to the space expansion type computer 332. The data is data corresponding to the interaction coefficient of the Ising model, and these data are written into a memory that stores the interaction of the Ising model. Next, an instruction for executing the calculation is transmitted from the time expansion type computer 302 to the control module 331 through the control signal 304. At this time, setting data indicating how much time is to be spent for calculation by the space expansion type computer 332 and how to change the temperature is also transmitted to the control module 331. The control module 331 transmits the clock for executing the interaction of the Ising model to the spin unit inside the space expansion type computer 332, and generates and inputs the address for executing the interaction. The space expansion type computer 332 performs calculation, using the clock and the address signal. In addition, the control module 331 manages the time of calculation performed in the space expansion type computer 332, and changes the temperature state, that is, the frequency of 1 or 0 included in the random number sequence according to the time. With respect to the temperature change, the change is performed based on the setting information transmitted from the time expansion type computer 302. Therefore, the control module 331 itself can have the same configuration as the control module 301 of FIG. 7 described in Embodiment 1.

As described above, by using the present embodiment, the control module can execute the calculation of the space expansion type computer, and it is possible to suppress the resources of the time expansion type computer for controlling the space expansion type computer.

Embodiment 4

In Embodiments 1 to 3, the case where the temperature scheduling, which is one control element of the space expansion type computer, is determined by time has been described.

FIG. 15 is an example of a concept of temperature scheduling. This can be realized by lowering the ratio of 1 of the random number sequence over time as shown in FIG. 15, for example. In this way, in a case where the scheduling is determined in advance, the space expansion type computer may be operated according to a schedule which is determined in advance by the time expansion type computer or the control module. For example, this schedule is transmitted from the time expansion type computer to the control module as a part of the setting data, stored in the setting register of the control module, and control of the random number sequence is performed according to the schedule.

However, it is inherently desirable that the ratio of 1 decreases, as the energy of the Ising model, which is a space expansion type calculator, decreases. Therefore, it becomes possible to obtain a solution with higher accuracy, by checking the energy of the Ising model and changing the ratio of 1 included in the random number sequence according to the energy. In Embodiment 4, an example of a control module for realizing the operation is shown. A case where parts other than the control module correspond to Embodiment 2 (FIG. 10 and FIG. 11) will be described, but the same configuration is adopted in other cases as well.

FIG. 16 shows an internal configuration of the control module. The control module 341 includes a setting register 312 that holds the setting data transmitted from the time expansion type computer 302, a random number generator 314 that generates random numbers to be used, a memory 327 that temporarily holds data used in the space expansion type computer 303 and the result of the space expansion type computer 303, and an energy calculation module 343 that calculates the energy of the Ising model. The control logic module 342 generates the interaction clock 181, the interaction address 180, and the random number 142, based on the information of these components.

When exchanging data with the space expansion type computer 303, the I/O clock 192, the R/W control signal 193, and the IO address 190 are generated. When the calculation by the space expansion type computer 303 is completed, the I/O clock 192, the R/W control signal 193, and the IO address 190 are generated, the calculation result is read from the space expansion type computer 303 and stored in the memory 327, and the time expansion type computer 302 is notified that the calculation is completed through the control signal 304. At the same time, the calculation result held in the memory 327 is transferred to the time expansion type computer through the I/O data 325.

When the space expansion type computer 303 executes the calculation, the space expansion type computer 303 is supplied with the interaction clock 181 and executes the interaction calculation. Further, the state on the way of the space expansion type computer is read into the control module 301 at any time by using the IO function. More specifically, for example, the value stored in the memory cell N in FIG. 3 is read, using the IO clock 192, the R/W control signal 193, and the I/O address 190. The energy calculation module 343 calculates the energy of the Ising model using the read data, and the ratio between 1 and 0 in the random number sequence is changed according to the energy. More specifically, the ratio of 1 decreases as energy decreases. As a method of changing the ratio between 1 and 0 in the random number sequence, various known methods may be applied. By doing this type of operation, it becomes possible to operate a space calculation type computer with high accuracy.

FIG. 17 shows an example of a processing flow. In S422, data is transmitted from the time expansion type computer to the space expansion type computer through the IO address line, the IO clock, and the IO data, and the value of the coefficient is set. Further, in some cases, the spin value is also input in S423, similarly. Next, in S424, a control signal is transmitted from the space expansion type computer to the control module, and interaction calculation is started. During the interaction calculation, in S425, a clock and an address for interaction and a random number are supplied from the control module, and interaction is executed. In S426, energy calculation of the Ising model in that state is executed in the control module. In S427, it is checked whether or not the energy has fallen below a predetermined value, and in a case where it has fallen below, the process returns to S425 and interaction calculation is executed. In a case where the energy reaches a predetermined value, in S428, the control module notifies the time expansion type computer that the operation is ended. Along with this, in S429, the time expansion type computer reads out the calculation result, using the IO clock, the address, and the data line.

In the example described above, the random number generator is used, but as another means for randomly inverting the spin value, there is a method of inducing a bit error of the memory cell by lowering the power supply voltage supplied to the memory cell expressing the spin, and randomly changing the spin arrangement. For this purpose, among the memory cells of the spin unit 200, the memory cell N storing the spin value operates with the voltage supplied through a spin dedicated power supply line. Further, memory cells holding coefficients and constituent elements other than the memory cells, for example, logic gates for calculating interactions, are operated with a voltage normally supplied from a power supply line.

With respect to the bit error rate of the memory cell, as the voltage decreases from a proper voltage for recording, the bit error rate worsens in proportion to the decrease in the voltage. Utilizing this state, the error rate is set to a high state at the initial stage of the ground state search, and the voltage is changed to a state where the bit error rate is low as the search progresses. For example, in a case of changing the configuration of FIG. 5 to this system, a spin dedicated power supply line may be provided in the space expansion type computer 303, and a control signal for controlling the voltage of the spin dedicated power supply line may be used instead of the random number 142.

Hitherto, the invention made by the present inventor has been described in detail based on the embodiments. As described in the embodiments, the present invention can be applied to a space expansion type computer handling Ising models, neural networks, and the like. However, it is needless to say that the present invention is not limited to the above-described embodiments, and various modifications can be made without departing from the gist thereof.

For example, the above embodiments have been described in detail in order to explain the present invention in an easy-to-understand manner and are not necessarily limited to those having all the configurations described. Further, with respect to a part of the configuration of the embodiments, addition, deletion, and replacement of other configurations can be performed.

INDUSTRIAL APPLICABILITY

The present invention can be applied to an information processing system handling various calculations.

REFERENCE SIGNS LIST

100 ISING CHIP
110 SPIN ARRAY
120 IO DRIVER
130 IO ADDRESS DECODER
140 INTERACTION ADDRESS DECODER
142 RANDOM NUMBER
145 POWER SUPPLY LINE
180 INTERACTION ADDRESS
181 INTERACTION CLOCK
190 ADDRESS BUS
191 DATA BUS
192 IO CLOCK
193 R/W CONTROL LINE
200 SPIN UNIT
201 MAJORITY LOGIC
301, 321, 331, 341 CONTROL MODULE
302 TIME EXPANSION TYPE COMPUTER
303, 332 SPACE EXPANSION TYPE COMPUTER
304, 305 CONTROL SIGNAL
306 DATA LINE
311, 326, 342 CONTROL LOGIC MODULE
312 SETTING REGISTER
313 TIMER
314 RANDOM NUMBER GENERATOR
322, 323 DATA/CONTROL SIGNAL
324 CONTROL SIGNAL
325 IO DATA
327 MEMORY
343 ENERGY CALCULATION MODULE

The invention claimed is:

1. An information processing system comprising:
   a first computer;
   a control module controlled by the first computer; and
   a second computer configured to be associated with the control module,
   wherein the second computer includes a plurality of units arranged into two groups,
   wherein each of the plurality of units includes a first memory that stores a value indicating a state of a node, a second memory that stores a coefficient, and an arithmetic circuit,
   wherein the arithmetic circuit performs an arithmetic process of determining a value indicating a state of the node of its own unit, based on a value indicating a state of a node of a different unit and the coefficient of its own unit, and storing the determined value in the first memory, and
   wherein the control module supplies control signals for controlling the arithmetic process to each said unit of the second computer such that only one group comprising alternating units of said plurality of units performs said arithmetic process at one time.

2. The information processing system according to claim 1,
   wherein the control signal includes an address for designating the unit to perform the arithmetic process, and a clock for generating a timing to perform the arithmetic process.

3. The information processing system according to claim 2,
   wherein the control signal further includes a signal for changing the value indicating a state of a node stored in the first memory.

4. The information processing system according to claim 3,
   wherein the signal for changing the value indicating a state of a node is a random number sequence.

5. The information processing system according to claim 1,
   wherein N control modules are connected to one first computer, and one second computer corresponds to one control module.

6. The information processing system according to claim 5,
   wherein N second computers are connected to the one first computer, the coefficient is transmitted from the first computer to the second computer, and the coefficient is stored in the second memory, and
   wherein the control signal includes an address for designating the unit to perform the arithmetic process, and a clock for generating a timing to perform the arithmetic process.

7. The information processing system according to claim 5,
   wherein the coefficient is transmitted from the first computer to the control module, and the coefficient is stored in the second memory from the control module, and
   wherein the control signal includes an address for designating the unit to perform the arithmetic process, and a clock for generating a timing to perform the arithmetic process.

8. The information processing system according to claim 5,
   wherein N second computers are connected to the one first computer, the coefficient is transmitted from the first computer to the second computer, and the coefficient is stored in the second memory,
   wherein the second computer is equipped with the control module, and
   wherein the control signal includes an address for designating the unit to perform the arithmetic process, and a clock for generating a timing to perform the arithmetic process.

9. The information processing system according to claim 5,
   wherein the control signal includes an address for designating the unit to perform the arithmetic process, and a clock for generating a timing to perform the arithmetic process,
   wherein the control module includes a random number generator, and supplies a random number sequence generated by the random number generator to the second computer, and
   wherein the first computer supplies setting data indicating at least one of a ratio between 1 and 0 in the random number sequence, start of generation of a random number sequence, and stop of generation of a random number sequence to the control module.

10. The information processing system according to claim 5,
    wherein the control signal includes an address for designating the unit to perform the arithmetic process, and a clock for generating a timing to perform the arithmetic process, and
    wherein the first computer supplies setting data indicating at least one of the number of times of the arithmetic process and an arithmetic processing time to the control module.

11. An information processing system comprising:
    a computer; and
    a control module,
    wherein the computer includes a plurality of units arranged into two groups,
    wherein each of the plurality of units includes a first memory, a second memory, and an arithmetic circuit,
    wherein the arithmetic circuit performs an arithmetic process of determining a value to be stored in a first memory cell of its own unit, based on a value stored in the first memory of a different unit and a value stored in the second memory of its own unit, and
    wherein the control module supplies a first control signal designating the memory and a second control signal designating a timing to the computer in order to control the arithmetic process such that only one group comprising alternating units of said plurality of units performs said arithmetic process at one time.

12. The information processing system according to claim 11,
    wherein the control module includes a setting register that stores setting data indicating at least one of the number of times of the arithmetic process and an arithmetic processing time, which are included in a control signal from a host apparatus.

13. The information processing system according to claim 11,
    wherein the control module includes a random number generator that supplies a random number sequence to the computer, and
    a setting register that stores setting data indicating at least one of a ratio between 1 and 0 in the random number sequence, start of generation of the random number sequence, and stop of generation of the random number sequence, which are included in a control signal from a host apparatus.

14. The information processing system according to claim 11, wherein the control module includes a nonvolatile memory that holds data specific to the computer.

15. The information processing system according to claim 11,
wherein the control module includes
a control logic module that reads the value in the first memory of the computer, using an IO clock, an R/W control signal, and an I/O address,
an energy calculation module that calculates a state of the arithmetic process of the computer, using the read value, and
a random number generator that supplies a random number sequence to the computer, and
wherein the ratio between 1 and 0 in the random number sequence is changed according to the state of the arithmetic process.

* * * * *